(12) United States Patent
Horner

(10) Patent No.: US 6,312,220 B1
(45) Date of Patent: Nov. 6, 2001

(54) AIR TURBINE MOTOR

(76) Inventor: Kenneth Douglas Horner, 14-16 Westpool Drive, Hallam, Victoria 3903 (AU)

( * ) Notice: Subject to any disclaimer, the term of this patent is extended or adjusted under 35 U.S.C. 154(b) by 0 days.

(21) Appl. No.: 09/530,146

(22) PCT Filed: Oct. 27, 1998

(86) PCT No.: PCT/AU98/00890

§ 371 Date: Jun. 2, 2000

§ 102(e) Date: Jun. 2, 2000

(87) PCT Pub. No.: WO99/22117

PCT Pub. Date: May 6, 1999

(30) Foreign Application Priority Data

Oct. 27, 1997 (AU) .................................................. PO0033

(51) Int. Cl.[7] .................................................. F01D 1/02
(52) U.S. Cl. .................................. 415/199.2; 415/199.4; 415/199.6; 415/202
(58) Field of Search ............................... 415/199.1, 199.2, 415/199.4, 199.5, 199.6, 202, 208.4, 209.1

(56) References Cited

U.S. PATENT DOCUMENTS 4,428,715 * 1/1984 Wiggins ............................ 415/199.2
4,470,256 * 9/1984 Palmer ................................ 60/39.29

FOREIGN PATENT DOCUMENTS

10945/23 A   7/1923 (AU) .

OTHER PUBLICATIONS

Derwent Abstract Accession No. G 3015C/32 SU 703670A (Leningrad Poly) Dec. 15, 1979—Abstract and Figure.

Derwent Abstract Accession No. 83–734030/32 SU 964197A (Lengd Kalinin Poly) Oct. 9, 1982—Abstract and Figure.

Derwent Abstract Accession No. 91–085835/12 SU 1560731A (Lengd Kalinin Poly) Apr. 30, 1990—Abstract and Figure.

* cited by examiner

Primary Examiner—Edward K. Look
Assistant Examiner—Ninh Nguyen
(74) Attorney, Agent, or Firm—Welsh & Katz, Ltd.

(57) ABSTRACT

An air turbine motor has a turbine wheel mounted for rotation in a housing. A first set of elements distributed around the circumference of the turbine wheel drive the wheel in rotation in response to an axial flow of drive air. A second set of elements on a face of the wheel drive the wheel in rotation in response to radial flow of drive air. Stators direct drive air to the first elements in an axial direction and to the second elements in a radial direction.

8 Claims, 2 Drawing Sheets

AIR TURBINE MOTOR

FIELD OF THE INVENTION

This invention relates to air turbine motors. The invention has been particularly developed for use in a pneumatic starter motor and will be primarily described with reference to this application. The motor is however suitable for use in other applications where pneumatic motors are used due to the nature of the operating environment or otherwise.

BACKGROUND ART

Pneumatic starter motors are used for cranking internal combustion engines for starting purposes and are typically used for large engines and engines operating in environments where electric starting systems can be hazardous such as in mines.

Some known pneumatic starter motors have utilised an arrangement in which a flow of air generally parallel to the axis of rotation of a turbine wheel interacts with turbine elements to drive the wheel in rotation. In some other known pneumatic starter motors, air is directed radially with respect to the axis of rotation of a turbine wheel to interact with radially oriented elements which drive the wheel in rotation. Whilst both arrangements have been used to provide satisfactory air motors for pneumatic starters and other applications, improvements in output and operating characteristics are continuously sought.

DISCLOSURE OF THE INVENTION

It is an object of this invention to provide an improved air turbine motor.

Accordingly, this invention provides an air turbine motor including a turbine wheel mounted for rotation about an axis, a first set of elements displaced around said turbine wheel and arranged to drive said turbine wheel in rotation about said axis in a first direction in response to an axial flow of air generally parallel to said axis, a second set of elements displaced around said turbine and arranged to drive said turbine wheel in rotation about said axis in said first direction in response to a radial flow of air generally perpendicular to said axis, and means to direct drive air to said first set of elements in an axially directed flow and to direct drive air to said second set of elements in a radially directed flow.

In the preferred form of the invention, the drive air is firstly directed to the first or axially driven set of elements and is subsequently directed to the second or radially driven set of elements. Although this is the currently preferred configuration there are applications in which the path of the drive could be reversed.

Preferably, the axially driven set of elements is arranged around an outer circumferential edge of the turbine wheel and the radially driven set of elements is arranged on a face of said turbine wheel.

The radially driven set of elements are preferably arranged in two consecutive stages whereby the drive air passes through one stage and then the other stage. The consecutive stages are preferably formed by arranging the elements in two concentric circular arrays.

The turbine wheel is preferably mounted between two stator arrangements. The first of the stators directs drive air axially toward said axially driven elements whilst the second stator re-directs air emerging from said axially driven elements in a radial direction to said radially driven elements.

This preferred turbine stator configuration prevents a high side thrust loading on the turbine wheel. This is because the inlet air through the first stator exerts force which is opposite to the axial force developed by the air passing through the radially driven elements on the remote side of the turbine wheel. Additionally, the configuration allows a very compact and easily assembled air turbine motor to be produced.

The air turbine motor according to this invention has been found to provide a superior power output for a given drive air input. This allows a corresponding reduction in the size of the motor to produce a given power output. The air turbine motor of this invention also as a higher stall torque, that is, torque at zero rpm. This is particularly important for applications to pneumatic starter motors since start load is frequently very high.

The use of multiple stages through the respective axial and radial elements also allows speed control of the turbine motor.

The invention will now be described, by way of example only, with reference to the accompanying drawings.

BEST MODE FOR CARRYING OUT THE INVENTION

Figure 1:
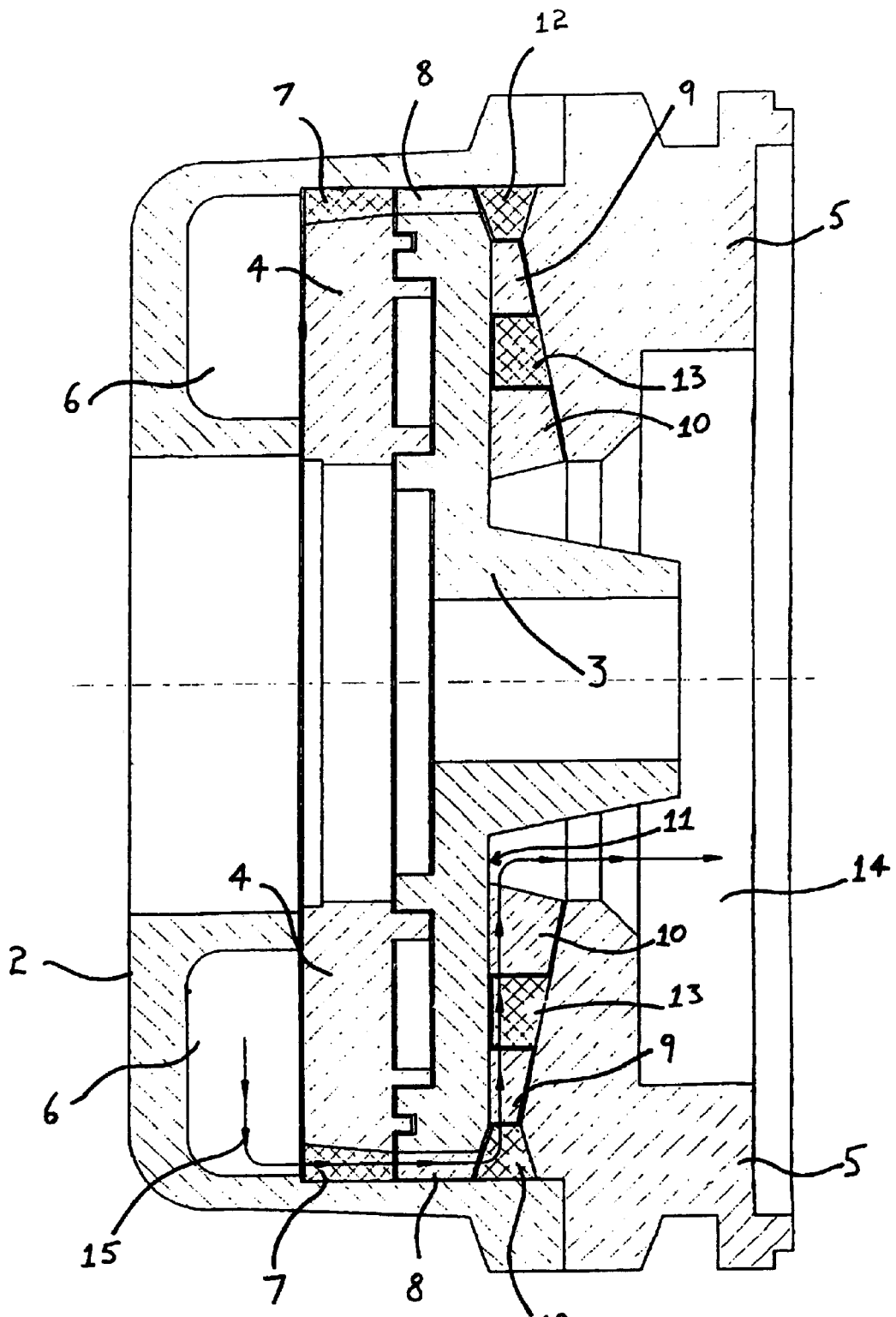
FIG. 1 is a schematic sectional view of an air turbine motor according to this invention.
Figure 2:
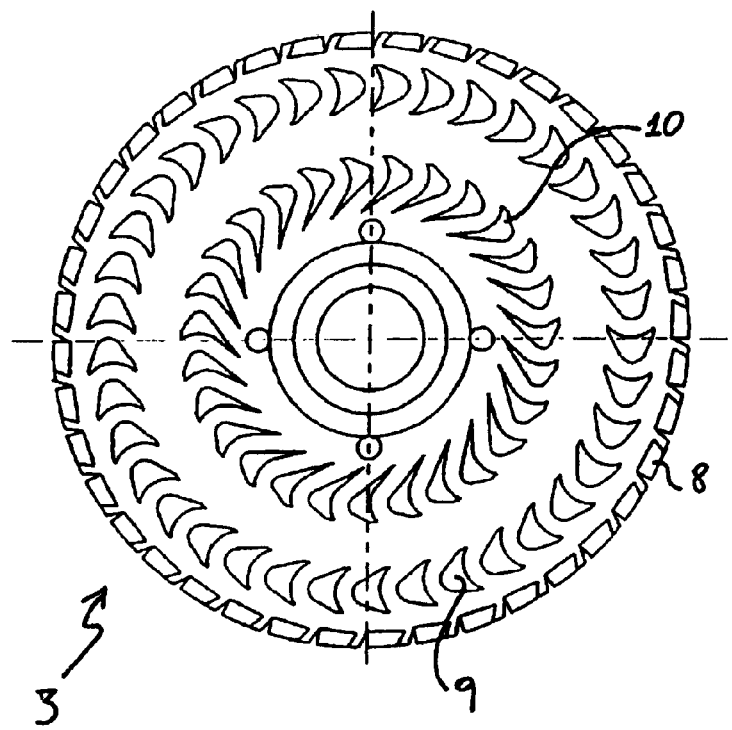
FIG. 2 is an elevation of the turbine forming part of the air motor of FIG. 1.
Figure 3:
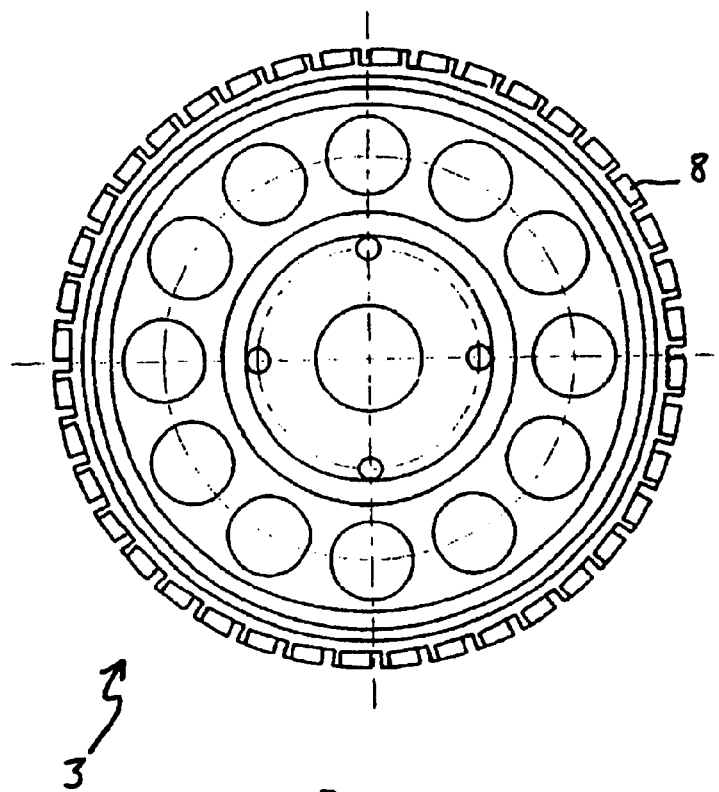
FIG. 3 is a rear elevation of the turbine shown in FIG. 2.

As seen in the drawings, the air turbine motor 1 according to this invention comprises a housing 2 in which a turbine wheel 3 is mounted for rotation between an air inlet stator 4 and a second stator 5. An air inlet manifold 6 is provided in the housing in a known way. Stator 4 has a series of sequentially arranged elements or vanes 7 which direct air flow from manifold 6 toward turbine wheel 3. The outer circumference of turbine wheel 3 supports an array of axial turbine elements 8 evenly distributed around the circumference of the turbine wheel. Two concentric rings of radial turbine elements 9, 10 are formed on a face 11 of wheel 3 remote from the inlet stator 4. The second stator 5 is provided with circular arrays of elements or vanes 12, 13 which respectively fit between axial elements 8 and 9 and radial elements 9 and 10. An exhaust manifold 14 is provide in housing 2.

Stators 4 and 5 support turbine wheel 3, for rotation about its axis. The turbine 3 is supported by the interengaging formations and does not require the use of supporting bearings. This is made possible by the above configuration in which the turbine wheel 3 is similarly loaded in opposing axial directions by the drive air pressure thus avoiding any axially longitudinal loading. In this regard the inlet air directed through element 7 of stator 4 exerts a net force to the right as viewed in FIG. 1 whilst the longitudinal loading by virtue of the air directed through elements 9, 13 and 10 is to the left as viewed in FIG. 1.

Arrows 15 show the path of the air through the air turbine motor. In use the air is admitted to manifold 6 by an appropriate control valve (not shown) in the known manner. The air passes through elements 7 of stator 4 which direct the air generally axially into axially driven elements 8. The air exiting elements 8 is turned through 90° by elements 12 of stator 5 to become a radially directed flow into the radially driven elements 9. The air exiting elements 9 is directed into the second stage of radially driven elements 10 (or third stage of the motor) by elements 13 of stator 5. The air then passes into exhaust manifold 14 for exhaust to the atmosphere in the usual manner.

The foregoing describes only one embodiment of the invention and modifications can be made without departing from the scope of the invention.

What is claimed is:

1. An air turbine motor including a turbine wheel mounted for rotation about an axis, a first set of elements displaced around said turbine wheel and arranged to drive said turbine wheel in rotation about said axis in a first direction in response to an axial flow of air generally parallel to said axis, a second set of elements displaced around said turbine and arranged to drive said turbine wheel in rotation about said axis in said first direction in response to a radial flow of air generally perpendicular to said axis, and means for directing drive air to said first set of elements in an axially directed flow and for directing drive air to said second set of elements in a radially directed flow.

2. An air turbine motor as claimed in claim 1 wherein the drive air is first directed to said first set of drive elements and is subsequently directed to said second set of drive elements.

3. An air turbine motor as claimed in claim 1 wherein said first set of elements is arranged around an outer circumferential edge of said turbine wheel.

4. An air turbine motor as claimed in claim 3 wherein said second set of elements is arranged on a face of said turbine wheel.

5. An air turbine motor as claimed in claim 4 wherein said second set of elements is arranged in two consecutive stages whereby the drive air passes through one stage and then the other stage.

6. An air turbine motor as claimed in claim 5 wherein said two consecutive stages are formed by arranging the elements in two concentric circular arrays.

7. An air turbine motor as claimed in claim 1 wherein said turbine wheel is mounted between two stators.

8. An air turbine motor as claimed in claim 7 wherein a first stator directs drive air axially toward said first set of elements and a second stator re-directs air emerging from the first set of elements to said second set of elements in a radial direction.

* * * * *